United States Patent
Covey et al.

(10) Patent No.: US 12,209,989 B2
(45) Date of Patent: *Jan. 28, 2025

(54) SAMPLING PROBE WITH INTERNAL SAMPLING FOR USE IN MASS SPECTROMETRY SYSTEMS AND METHODS

(71) Applicant: DH TECHNOLOGIES DEVELOPMENT PTE. LTD., Singapore (SG)

(72) Inventors: Thomas R. Covey, Newmarket (CA); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 383 days.

This patent is subject to a terminal disclaimer.

(21) Appl. No.: 17/753,921

(22) PCT Filed: Sep. 29, 2020

(86) PCT No.: PCT/IB2020/059070
§ 371 (c)(1),
(2) Date: Mar. 18, 2022

(87) PCT Pub. No.: WO2021/064559
PCT Pub. Date: Apr. 8, 2021

(65) Prior Publication Data
US 2023/0349858 A1    Nov. 2, 2023

Related U.S. Application Data

(60) Provisional application No. 62/908,012, filed on Sep. 30, 2019.

(51) Int. Cl.
*G01N 27/62*    (2021.01)
*G01N 27/623*   (2021.01)
(Continued)

(52) U.S. Cl.
CPC ........ *G01N 27/623* (2021.01); *G01N 27/624* (2013.01); *H01J 49/0459* (2013.01)

(58) Field of Classification Search
CPC .. G01N 27/623; G01N 27/624; H01J 49/0459
(Continued)

(56) References Cited

U.S. PATENT DOCUMENTS

| 5,109,840 A | 5/1992 | Daleiden |
| 5,691,205 A | 11/1997 | Kawabata et al. |

(Continued)

FOREIGN PATENT DOCUMENTS

| EP | 0421007 | 4/1991 |
| EP | 2443432 | 4/2012 |

(Continued)

OTHER PUBLICATIONS

International Search Report and Written Opinion for PCT/IB2020/059070, mailed Dec. 17, 2020.
(Continued)

*Primary Examiner* — Nicole M Ippolito
(74) *Attorney, Agent, or Firm* — Merchant & Gould P.C.

(57) ABSTRACT

MS-based methods and systems are provided herein in which a desorption solvent desorbs one or more analyte species from an SPME device within a sampling interface that is fluidly coupled to an ion source for subsequent mass spectrometric analysis. In accordance with various aspects of the applicants teachings, the sampling interface includes an internal sampling conduit that provides increased interaction between the desorption solvent and the sampling substrate, thereby improving mass transfer (e.g., increased extraction or desorption speed).

20 Claims, 5 Drawing Sheets

(51) Int. Cl.
 *G01N 27/624* (2021.01)
 *H01J 49/04* (2006.01)
(58) Field of Classification Search
 USPC .............................. 250/281, 282, 283, 288
 See application file for complete search history.

(56) References Cited

U.S. PATENT DOCUMENTS

| | | | |
|---|---|---|---|
| 7,923,681 | B2 | 4/2011 | Collings et al. |
| 10,770,277 | B2 | 9/2020 | Datwani et al. |
| 11,232,938 | B2 * | 1/2022 | Arnold ............... H01J 49/0459 |
| 2003/0193020 | A1 | 10/2003 | Van Berkel |
| 2004/0102742 | A1 | 5/2004 | Tuyl |
| 2013/0092166 | A1 | 4/2013 | Pearce |
| 2013/0118498 | A1 | 5/2013 | Robitaille et al. |
| 2013/0294971 | A1 | 11/2013 | Van Berkel et al. |
| 2014/0216177 | A1 | 8/2014 | Van Berkel et al. |
| 2014/0283627 | A1 | 9/2014 | Hattingh et al. |
| 2016/0266017 | A1 | 9/2016 | Kennedy et al. |
| 2017/0316926 | A1 | 11/2017 | Arnold et al. |
| 2018/0021533 | A1 | 1/2018 | Gausche-Hill et al. |
| 2019/0157061 | A1 | 5/2019 | Datwani et al. |
| 2020/0345968 | A1 | 11/2020 | Merrell et al. |
| 2020/0365382 | A1 | 11/2020 | Arnold et al. |
| 2021/0121905 | A1 | 4/2021 | Covey |
| 2024/0079225 | A1 | 3/2024 | Covey |
| 2024/0096611 | A1 | 3/2024 | Covey |
| 2024/0112901 | A1 | 4/2024 | Liu |
| 2024/0159716 | A1 | 5/2024 | Cox |
| 2024/0170270 | A1 | 5/2024 | Kovarik |
| 2024/0170271 | A1 | 5/2024 | Kovarik |
| 2024/0175787 | A1 | 5/2024 | Tate |
| 2024/0272191 | A1 | 8/2024 | Verma |

FOREIGN PATENT DOCUMENTS

| | | |
|---|---|---|
| WO | 2010/048339 | 12/2010 |
| WO | 2011/146269 | 11/2011 |
| WO | 2012/149314 | 11/2012 |
| WO | 2013/112914 | 8/2013 |
| WO | 2014/140776 | 9/2014 |
| WO | 2015/108807 | 7/2015 |
| WO | 2015/188282 | 12/2015 |
| WO | 2018/217778 | 11/2018 |
| WO | 2019/102350 | 5/2019 |
| WO | 2019/126363 | 6/2019 |
| WO | 2020/016809 | 1/2020 |
| WO | 2020/079647 | 4/2020 |
| WO | 2021/234644 | 11/2021 |
| WO | 2022/172199 | 8/2022 |
| WO | 2022/201037 | 9/2022 |
| WO | 2022/208393 | 10/2022 |

OTHER PUBLICATIONS

Tascon et al. "Development of a Microfluidic Open Interface with Flow Isolated Desorption Volume for the Direct Coupling of SPME Devices to Mass Spectrometry." Analytical Chemistry, vol. 90, No. 4, Feb. 1, 2018, pp. 2631-2638.

Anonymous, "Turbo V Ion Source Operator Guide", AB Sciex Pte, Ltd., Aug. 1, 2015, retrieved from the internet on Mar. 17, 2022 at: https://manualzz.com/doc/7476753/user-guide—turbo-v-ion-source-operator-guide, "TurbolonSpray Probe Optimization", and "Adjust the Electrode Tip Extension", 52 pages.
Bonvin, Gregoire et al., "Capillary electrophoresis; electrospray ionization—mass spectrometry interfaces: Fundamental concepts and technical developments", Journal of Chromatopgraphy A, vol. 1267, Dec. 1, 2012, pp. 17-31.
Dirico, Kenneth et al., "Ultra-High-Throughput Acoustic Droplet Ejection-Open Port Interface—Mass Spectrometry for Parallel Medicinal Chemistry", ACS Medicinal Chemistry Letters, vol. 11, No. 6, May 1, 2020, pp. 1101-1110.
Hager, James et al., "Product ion scanning using Q-q-Q linear ion trap (Q TRAP) mass spectrometer", Rapid Communications in Mass Spectrometry, 2003; 17: 1056-1064.
Liu, Chang et al., "Operational Modes and Speed Considerations of an Acoustic Droplet Dispenser for Mass Sectrometry", Analytical Chemistry, vol. 92, No. 24, Oct. 16, 2020, pp. 15818-15826.
Maxwell, E. Jane et al., "Decoupling CE and ESI for a more robust interface with MS", Electrophoresis, Verlag-Chemie, Hoboken, USA, vol. 31, No. 7, Mar. 1, 2010, pp. 1130-1137.
PCT International Preliminary Report onn Patentability in Application PCT/IB2020/059070, mailed Apr. 14, 2022, 9 pages.
Pei, Jian et al., "Analysis of Samples Stored as Individual Plugs in a Capilaary by Electrspray Ionization Mass Spectrometry", Analytical Chemistry, vol. 81, No. 15, Aug. 1, 2009, pp. 6558-6561.
Pei, Jian et al., "Rapid and Label-Free Screening of Enzyme Inhibitors Using Segmented Flow Electrospray Ionization Mass Spectrometry", Journal of the American Society for Mass Spectrometry, Elsevier, vol. 21, No. 7, Jul. 1, 2010, pp. 1107-1113.
SCIEX, Echo MS Core Module User Guide, published by SCIEX, RUO-IDV-05-9945-C, Apr. 2020, 51 pages.
Simon, Roman et al., "Acoustic Ejection Mass Spectrometry: A Fully Automatable Technology for High-Throughput Screening in Drug Discovery", Society for Laboratory Automation and Screening, vol. 26, Jul. 26, 2021, pp. 961-973.
Van Berkel et al., "Immediate drop on demand technology (I-DOT) coupled with mass spectrometry via an open-port sampling interface", Bioanalysis, vol. 9, No. 21, Nov. 2, 2017, pp. 1667-1679.
Van Berkel, Gary et al., "An open port sampling interface for liquid introduction atmosperic pressure ionization mass spectrometry: Open port sampling interface", Rapid Communications in Mass Spectrometry, vol. 29, No. 19, Oct. 15, 2015, pp. 1749-1756.
Van Berkel, Gary et al., "Combined Falling Drop/Open Port Sampling Interface System for Automated Flow Injection Mass Spectrometry", Analytic Chemistry, 2017, 89, 22, pp. 12578-12586.
Wen, Xiujuan et al., "Direct Analysis from Phase-Separated Liquid Samples using ADE-OPI-MS: Applicability to High-Throughput Screening for Inhibitors of Diacylglycerol Acyltransferase 2", Analytic Chemistry, 2021, 93, 15, 6071-6079.
Zhang, Hui et al., "Acoustic Ejection Mass Spectrometry for High-Throughput Analsis", bioRxiv, Jan. 29, 2020, retrieved from the internet on Sep. 8, 2021 at: https:www.biorxiv.org/content/10.1101/2020.01.28.923938v1.full.pdf, 32 pages.
Zhang, Hui et al., "Acoustic Ejection Mass Spectrometry for High-Throughput Analysis", Analytical Chemistry, Jan. 29, 2020, 12 pages.

* cited by examiner

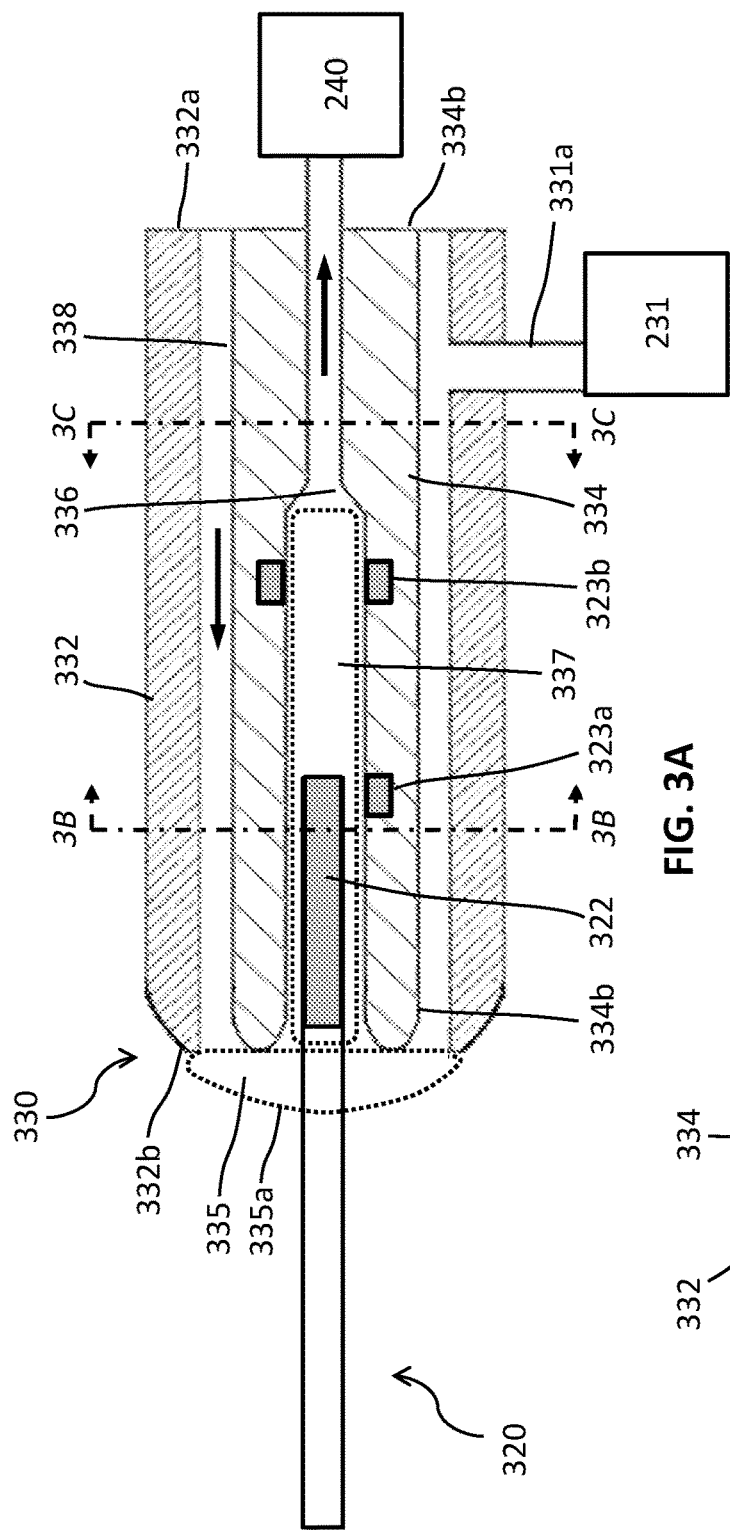
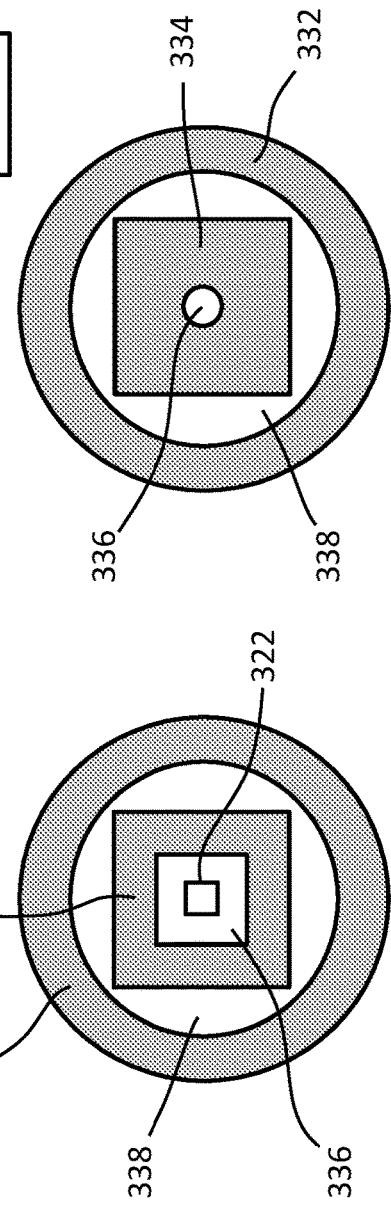
FIG. 3A
FIG. 3B
FIG. 3C

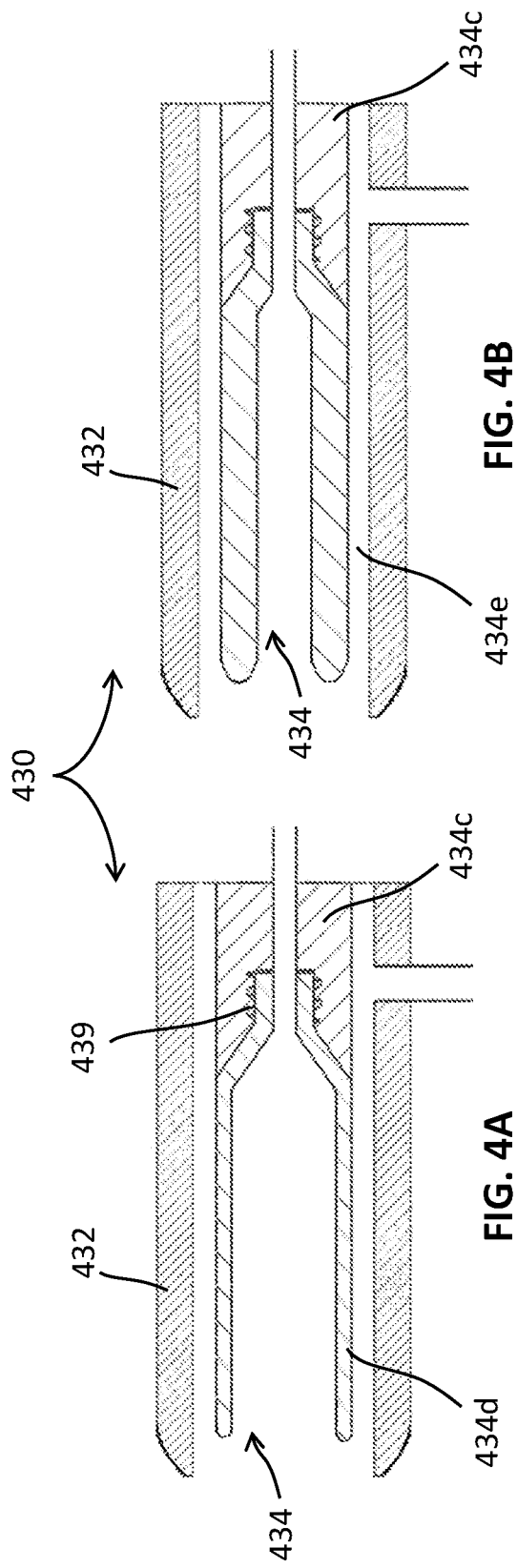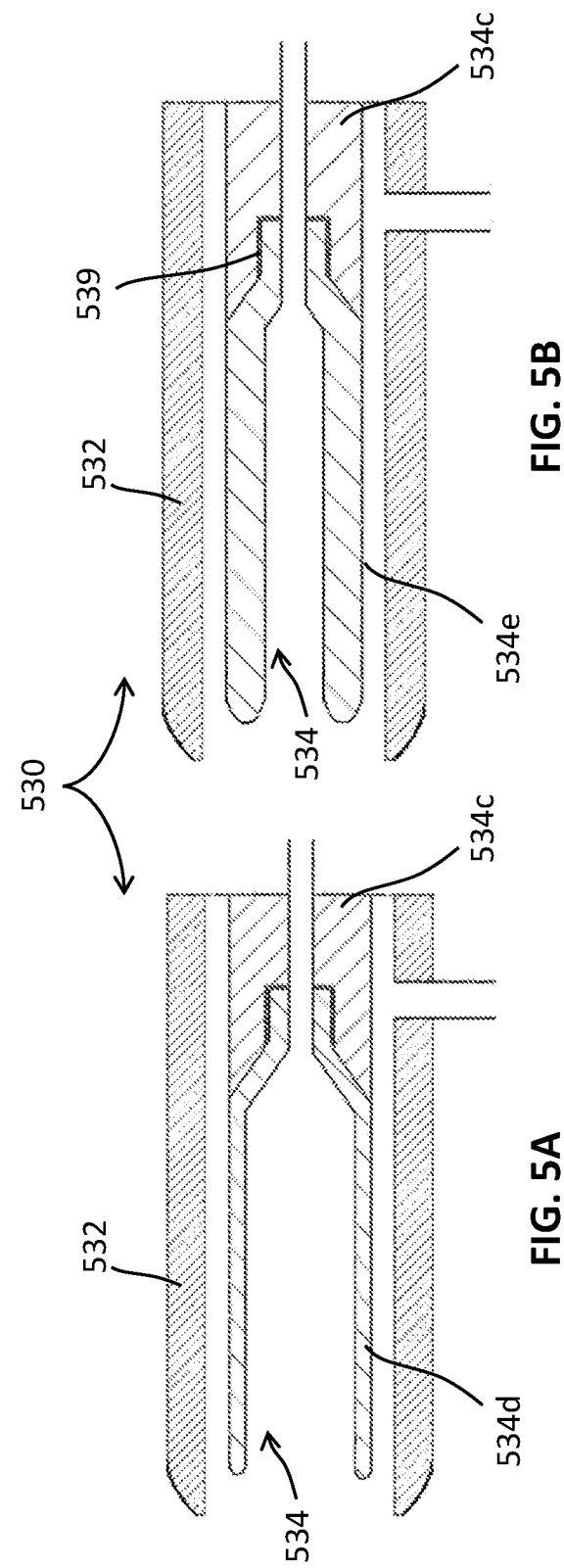

SAMPLING PROBE WITH INTERNAL SAMPLING FOR USE IN MASS SPECTROMETRY SYSTEMS AND METHODS

US RELATED APPLICATIONS

This application is a National Stage Application of PCT/IB2020/059070, filed Sep. 29, 2020, which claims the benefit of U.S. Provisional Application No. 62/908,012, filed on Sep. 30, 2019, the entire disclosures of which are incorporated herein by reference in their entireties. To the extent appropriate, a claim of priority is made to each of the above-disclosed applications.

FIELD

The present teachings generally relate to mass spectrometry, and more particularly to sampling interfaces for mass spectrometry systems and methods.

INTRODUCTION

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Given its sensitivity and selectivity, MS is particularly important in life science applications.

In the analysis of complex sample matrices (e.g., biological, environmental, and food samples), many current MS techniques require extensive pre-treatment steps to be performed on the sample prior to MS detection/analysis of the analyte of interest. Such pre-analytical steps can include sampling (i.e., sample collection) and sample preparation (separation from the matrix, concentration, fractionation and, if necessary, derivatization). It has been estimated, for example, that more than 80% of the overall analytical process can be spent on sample collection and preparation in order to enable the analyte's detection via MS or to remove potential sources of interference contained within the sample matrix, while nonetheless increasing potential sources of dilution and/or error at each sample preparation stage.

Ideally, sample preparation techniques for MS should be fast, reliable, reproducible, inexpensive, and in some aspects, amenable to automation. One recent example of an improved sample preparation technique is solid-phase microextraction (SPME), which essentially integrates sampling, sample preparation, and extraction into a single solvent-free step. Generally, SPME devices utilize a fiber or other surface (e.g., blades, micro-tips, pins, or mesh) coated with an extracting phase to which analytes within the sample can be preferentially adsorbed when the device is inserted into the sample. Because extraction can take place in situ by inserting a biocompatible device directly into tissue, blood, or other biological matrix for a short period of time, SPME devices may not require any sample collection. Alternatively, SPME devices can be used for ex vivo analysis using a small amount of a collected sample (e.g., a sample aliquot).

Though SPME is generally considered to be accurate and simple and can result in decreased sample preparation time and disposal costs, the mass-spectrometric based analysis of SPME-prepared samples may nonetheless require additional equipment and/or time-consuming steps in order to ionize the analyte from the SPME device directly or to desorb the analytes from the SPME device prior to ionization as required for mass spectrometry (MS). By way of example, various ionization methods have been developed that can desorb/ionize analytes from condensed-phase samples with minimal sample handling (e.g., desorption electrospray ionization (DESI) and direct analysis in real time (DART), which "wipe-off" analytes from the samples by exposing their surfaces to an ionizing medium such as a gas or an aerosol). However, such techniques can also require sophisticated and costly equipment.

Alternatively, additional desorption steps have been utilized to extract the analytes from the SPME device prior to ionization via ionization techniques other than DESI or DART. For example, because electrospray ionization (ESI) is one of the most common ionization methods and requires the analyte to be in solution, some users have utilized liquid desorption and subsequent purification/separation of the extracted/enriched analytes via high-performance liquid chromatography (HPLC) prior to MS analysis. However, liquid desorption prior to HPLC may require several minutes to transfer the analyte from the SPME coating to the liquid phase due to requirements imposed on the HPLC mobile phase (weak solvent strength). Typically, high organic solvent has the best elution efficiency, but it cannot be injected directly to the typically-used reverse-phase LC columns. In order to compensate, either an elution solvent having less efficacy (e.g., a mixture of organic solvent and water) is typically utilized, or a follow-up dilution step with water prior to the LC injection is alternatively provided. Both options, however, can reduce sensitivity. Such conventional workflows of elution and LC-MS ejection also generally require a relatively high volume of liquid to be used in the elution step, which leads to additional dilution. Moreover, as discussed above, these increased sample-preparation/separation steps can decrease throughput, introduce potential sources of error, increase dilution, and cannot be easily automated.

Alternatively, some groups have proposed substantial modifications to the standard electrospray ion source. Typically in ESI, a liquid sample is continuously discharged into an ionization chamber from within an electrically conductive capillary, while an electric potential difference between the capillary and a counter electrode generates a strong electric field within the ionization chamber that electrically charges the liquid sample. This electric field causes the liquid discharged from the capillary to disperse into a plurality of charged micro-droplets drawn toward the counter electrode if the charge imposed on the liquid's surface is strong enough to overcome the surface tension of the liquid (i.e., the particles attempt to disperse the charge and return to a lower energy state). As solvent within the micro-droplets evaporates during desolvation in the ionization chamber, charged analyte ions can then enter a sampling orifice of the counter electrode for subsequent mass spectrometric analysis. PCT Pub. No. WO2015188282 entitled "A Probe For Extraction Of Molecules Of Interest From A Sample," which is incorporated by reference herein in its entirety, for example, thus purports to provide for electrospray ionization from an SPME device by applying the ionizing electric potential to the conductive SPME device itself (to which a discrete amount of a desorption solution is applied) such that ions are generated directly from the edges of the wetted substrate.

As exemplified in an article entitled "An open port sampling interface for liquid introduction atmospheric pressure ionization mass spectrometry" in the Rapid Communications in Mass Spectrometry, 29(19):1749-1756 (the teachings of which are incorporated in its entirety, Van Berkel et al. have introduced a sampling interface comprising coaxial tubes that allow the introduction of unprocessed samples into a solvent that may be delivered to an ion source for ionization thereby. While potentially reducing complex sample preparation, such sampling interfaces may suffer from relatively high detection limits for conventional SPME substrates (e.g., LOD in the ng/mL range) and/or poor mass transfer and insufficient flow rates about relatively larger substrates which provide increased area for analyte adsorption.

There remains a need for improved and/or reduced-cost systems that enable fast-coupling of SPME devices to MS systems with minimal alterations to the front-end while maintaining sensitivity, simplicity, selectivity, speed and throughput.

SUMMARY

Methods and systems for delivering a liquid sample to an ion source for the generation of ions and subsequent analysis by mass spectrometry are provided herein. In accordance with various aspects of the present teachings, MS-based systems and methods are provided in which a desorption solvent desorbs one or more analyte species from a sample substrate (e.g., an SPME device) within a sampling interface that is fluidly coupled to an ion source for subsequent mass spectrometric analysis (e.g., without a liquid chromatography (LC) column between the sampling interface and the ion source). In various aspects, the sampling interface comprises a substrate sampling probe having an outer tube and an inner tube disposed therewithin such that desorption solvent can flow from within the outer tube into the inner tube through a fluid chamber that is open to the atmosphere and into which a sample substrate may be received through the open end of the fluid chamber. In accordance with various aspects of the methods and systems described herein, the sampling interface can be configured to have an internal sampling volume within the inner tube that is configured to receive a portion of the sample substrate extending through the fluid chamber so as to provide increased interaction between the desorption solvent and the sample substrate, thereby improving mass transfer (e.g., increased extraction or desorption speed) and/or enabling the provision of an elution gradient for desorption. In certain aspects, the geometry of the internal sampling volume of the sampling probe may be optimized to reduce the fluid volume dead space while maintaining consistent solvent flow about the sample substrate. By way of example, the sample substrate-receiving end of the inner tube, disposed within a bore of the outer tube of the sampling probe, can exhibit a cross-sectional area greater than the inner tube's proximal end (e.g., toward the outlet of the inner tube which can be coupled to an ion source) such that a portion of the sample substrate to which the analyte(s) are absorbed can be disposed within desorption solvent within the inner tube. By desorbing analytes from the sample substrate disposed within the inner tube (as opposed to within the fluid chamber distal to the inner tube as in known open port sampling interfaces such as that proposed by Van Berkel (2015)), sampling probes in accordance with the present teachings can reduce substantially stagnant flow about the sample substrate, thereby leading to improved elution, sharper peaks, and/or improved sensitivity. In some aspects, the shape and/or the maximum inner dimension of the sample substrate-receiving end of the inner tube can be configured to receive a particularly-shaped and/or sized sample substrate (e.g., a SPME fiber, a SPME blade), for example, so as to reduce dead space and optimize the surface area of the coated portion of the sample substrate disposed in contact with the desorption solvent within the sampling volume of the inner tube. In this manner, the desorbed analytes can be contained within a minimum volume of desorption solvent, thereby decreasing dilution and/or sample loss and improving instrument response and sensitivity. As will be appreciated by a person skilled in the art in light of the present teachings, considerations for improving the kinetics of desorption (e.g., based on fluid flow velocity) can be balanced with considerations for reducing the volume of dead space (e.g., decreasing the volume of desorption solvent) so as to optimize the sensitivity of the disclosed devices, systems, and methods. As used herein "fluid velocity" generally refers to a linear fluid velocity (e.g., in units m/s) while "flow rate" generally refers to volumetric flow rate (e.g., in units L/min, $m^3/s$).

In accordance with various aspects of the present teachings, a system for analyzing a chemical composition of a specimen is provided, the system comprising a substrate sampling probe having an inner tube extending from a proximal end to a distal end, the inner tube defining a sampling conduit extending from a distal inlet to a proximal outlet configured to fluidly couple to an ion source probe for discharging desorption solvent in an ionization chamber in fluid communication with a sampling orifice of a mass spectrometer. An outer tube is disposed about the inner tube and also extends from a proximal end to a distal end such that the distal end of the inner tube is disposed relative to the distal end of the outer tube so as to define a fluid chamber extending distally from the distal end of the inner tube to a liquid/air interface (e.g., the desorption solvent within the fluid chamber is open to the atmosphere). The outer tube defines a desorption solvent conduit that extends from a proximal inlet configured to be in fluid communication with a desorption solvent source and that flows into the fluid chamber through a distal outlet of the desorption solvent conduit. The fluid chamber is also in fluid communication with the distal inlet of the sampling conduit. Within the distal end of the inner tube adjacent to the fluid chamber, a sampling volume is provided exhibiting a cross sectional area greater than a cross sectional area of a proximal portion of the sampling conduit. The sampling volume is configured to receive a coated surface of a sample substrate having one or more analyte species adsorbed thereto such that the coated surface is in contact with the desorption solvent within the sampling volume internal to the inner tube as the desorption solvent flows from the inlet of the desorption solvent conduit through the fluid chamber to the outlet of the sampling conduit. In some aspects, the distal end of the inner tube may be recessed relative to the distal end of the outer tube such that the fluid chamber also comprises a volume between the distal end of the inner tube and the distal end of the outer tube.

In various aspects, the volumetric flow rate within the sampling volume may be equivalent to the proximal portion of the sampling conduit having the reduced cross-sectional area such that the maximum fluid velocity through the sampling volume may be lower than a maximum fluid velocity through the proximal portion of the sampling conduit when the sample substrate is not disposed within the sampling volume. However, in some aspects, the substrate sampling probe may be configured to provide various relative fluid velocities about the coated portion of the substrate when disposed within the sampling volume. By way of example, in some aspects, the cross-sectional area of the sampling volume may be configured such that a maximum fluid velocity through the sampling volume is greater than, less than, or equal to a maximum fluid velocity through the proximal portion of the sampling conduit when the coated surface of the sample substrate is disposed within the sampling volume depending, for example, on the relative cross-sectional areas of the sampling volume and the proximal portion of the sampling conduit and the cross-sectional area of the coated portion of the sample substrate.

As noted above, in some aspects the sample substrate may comprise a SPME substrate, known in the art or hereafter developed, and the substrate sampling probe may in some aspects, be configured to accommodate particular sample substrates within the sampling volume. By way of example, the SPME substrate may comprise a fiber and the sampling volume may be shaped and/or sized for such a fiber. In some aspects, for example, the cross-sectional area of the sampling volume may have a similar cross-sectional shape as the fiber (e.g., circular for a circular fiber) but is greater than the cross-sectional area of the fiber at the coated surface. Alternatively, in some aspects, the SPME substrate may comprise a blade. In such aspects, the cross-sectional area of the sampling volume may comprise a variety of shapes (e.g., circular, rectangular, etc.), but the largest linear dimension of the cross-section of the sampling volume may be greater than the width of the blade at the coated surface such that the blade may be disposed within the sampling volume. In some aspects, for example, the sampling volume may be sized such that the entire coated surface of the sample substrate (the entire length, width, and height of the coated surface having analytes adsorbed thereto) may be disposed within the sampling volume. However, in certain aspects, the sampling conduit may be sized such that the coated surface of the sample substrate cannot be disposed within the proximal portion of the sampling conduit.

The sampling volume can have a variety of configurations, and in some aspects, may be specially configured to accommodate substrates of a particular size and/or shape. In some aspects, the sampling volume may exhibit a circular cross-sectional shape or a rectangular shape, by way of non-limiting example. The cross-sectional shape of the sampling volume may also be the same or different from the cross-sectional shape of the outer tube. Additionally or alternatively, the sampling volume and the proximal portion of the sampling conduit may exhibit different cross-sectional shapes. In order to accommodate different sample substrates, in some aspects, the inner tube may be interchangeable such that an optimal sampling volume may be selected for various sample substrate geometries, for example. By way of example, a distal portion of the inner tube comprising the sampling volume may be configured to be replaced with a second distal portion exhibiting a second sampling volume that is different in at least one of shape and cross-sectional area from the sampling volume in the original inner tube. The distal and proximal portions of the inner tube can be coupled to one another in a variety of manners (e.g., compression fit, threading, etc.). It will be appreciated in light of the present teachings, that the size and shape of the sampling volume defined by the inner tube can be optimized to improve the desorption kinetics and reduced dilution of the desorbed sample in order to increase the sensitivity of analysis thereof. In some aspects, the system can include a sample substrate, for example, having a surface coated with an extraction phase configured to adsorb one or more species of analyte, wherein at least a portion of the coated surface is configured to be inserted through the distal end of the outer tube and the fluid chamber such that the coated surface having said analyte species adsorbed thereto is in contact with the desorption solvent within the sampling volume.

In various aspects, the system may further include one or more desorption solvent sources fluidly coupled to the inlet of the desorption solvent conduit and a pump mechanism for delivering the desorption solvent from the desorption solvent source(s) to the inlet of the desorption solvent conduit. Additionally or alternatively, the system may further comprise a controller for adjusting a flow rate of the desorption solvent flowing through one or more of the desorption solvent conduit, the sampling conduit, and the ion source probe. In various aspects, the desorption solvent source(s) may be configured to provide an elution gradient such that the composition of the desorption solvent to which a sample substrate disposed in the sampling volume is exposed changes over time.

In some aspects, the system comprising a substrate sampling probe as otherwise discussed herein may be integrated to further include an ion source probe, an ionization chamber, and a mass spectrometer system, wherein the ion source probe is in fluid communication with the outlet of the sampling conduit and comprises a terminal end disposed in the ionization chamber such that analytes contained in the desorption solvent may be ionized as the desorption solvent is discharged into the ionization chamber.

In certain aspects, the system can also include a specimen holder configured to support the sample substrate during insertion into the substrate sampling probe. An actuation mechanism coupled to the specimen holder can be configured to insert the sample substrate into the distal end of the outer capillary tube such that the coated surface of said sample substrate is in contact with the desorption solvent. In such examples, various steps of the chemical analysis procedures performed by the exemplary systems described herein can be automated (e.g., performed by a robotic system). In some aspects, for example, the system can comprise a specimen stage configured to support a plurality of sample substrates, wherein the actuation mechanism is configured to sequentially insert each of said plurality of sample substrates into the distal end of the outer tube such that the coated surface of each of said plurality of sample substrates is in contact with the desorption solvent within the sampling volume. In some related aspects, though the desorption process and MS-sampling may be performed sequentially, the actuation mechanism can be configured to pre-treat a plurality of sample substrates simultaneously to increase throughput (e.g., pre-conditioning of the SPME substrate, sampling, and rinsing steps).

Methods for performing chemical analysis are also provided herein. In some aspects, for example, methods in accordance with the present teachings can comprise inserting at least a portion of a sample substrate into an open end of a substrate sampling probe, said sample substrate having a surface coated with an extraction phase to which one or more analyte species are adsorbed, said substrate sampling probe comprising: an inner tube extending from a proximal end to a distal end, said inner tube defining a sampling conduit extending from a distal inlet to a proximal outlet; an outer tube extending from a proximal end to a distal end and disposed about said inner tube, said outer tube defining a desorption solvent conduit extending from a proximal inlet configured to be in fluid communication with a desorption solvent source. The distal end of the inner tube is disposed relative to the distal end of the outer tube so as to define a fluid chamber extending distally from the distal end of the inner tube to a liquid/air interface, with the fluid chamber is in fluid communication with the distal outlet of the desorption solvent conduit and the distal inlet of the sampling conduit. Further, the sampling conduit comprises a sampling volume within the distal end of the inner tube adjacent to the fluid chamber, the sampling volume exhibiting a cross sectional area greater than a cross sectional area of a proximal portion of the sampling conduit. The desorption solvent is flowed from the inlet of the desorption solvent conduit, through the fluid chamber, and to the outlet of the sampling conduit such that at least a portion of said one or more analyte species is desorbed from the coated surface and is delivered to ion source probe within the desorption solvent. The desorption solvent containing the portion of the one or more analyte species can then be discharged from the ion source probe (e.g., into an ionization chamber) so as to form one or more ionized analyte species and mass spectrometric analysis can be performed on the one or more ionized analyte species.

In various aspects, inserting at least the portion of the sample substrate may comprise disposing the coated surface into the sampling volume within the inner tube. For example, the coated surface having one or more analyte species adsorbed thereto may be in contact with the desorption solvent within the sampling volume as the desorption solvent flows from the inlet of the desorption solvent conduit through the fluid chamber to the outlet of the sampling conduit.

In various aspects, the method can further comprise one or more steps including, for example, conditioning the sample substrate prior to insertion in a sample, inserting the SPME substrate into a sample so as to adsorb one or more analyte species contained within the sample to the coated surface, extracting the one or more analyte species from the sample, and rinsing the sample substrate (e.g., with water) prior to inserting the sample substrate into the substrate sampling probe. In some related aspects, after the one or more analytes species are adsorbed to the coated surface, the sample substrate is inserted into the substrate sampling probe without a step of performing liquid chromatography. In accordance with various aspects of the present teachings, one or more of the above steps can be automated (e.g., performed by a robotic system).

In certain aspects, the method can comprise one or more steps for performing chemical analysis subsequent to the desorption of the adsorbed analytes from the sample substrate and the ionization thereof. For example, performing mass spectrometric analysis may comprise performing $MRM^3$ quantitation. Additionally or alternatively, the one or more ionized analyte species may be transmitted through a differential mobility spectrometer prior to performing mass spectrometric analysis.

In certain aspects, the substrate sampling probe may be adjusted so as to accommodate sample substrates of a particular size and/or shape. By way of example, in various aspects, a distal portion of the inner tube comprising the sampling volume may be replaced with a second distal portion exhibiting a second sampling volume that is different in at least one of shape and cross-sectional area from the sampling volume in the original inner tube.

The improved kinetics provided by certain substrate sampling probes in accordance with the present teachings may also enable the provision of an elution gradient. By way of example, improved mass transfer may allow for quicker analyte desorption from the sample substrate, thereby allowing the provision of an elution gradient. In such aspects, flowing the desorption solvent may comprise providing an elution gradient to the sampling volume while the sample substrate is disposed within the sampling volume. In some aspects, for example, the composition of the desorption solvent to which the substrate is exposed when disposed within the sampling volume may be adjusted over time.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

FIGS. 3A-C schematically illustrate another exemplary substrate sampling probe suitable for use in the system of FIG. 1 in accordance with various aspects of the applicant's teachings.

FIGS. 4A-B schematically illustrate another exemplary substrate sampling probe suitable for use in the system of FIG. 1 in accordance with various aspects of the applicant's teachings.

FIGS. 5A-B schematically illustrate another exemplary substrate sampling probe suitable for use in the system of FIG. 1 in accordance with various aspects of the applicant's teachings.

DETAILED DESCRIPTION

Figure 1:
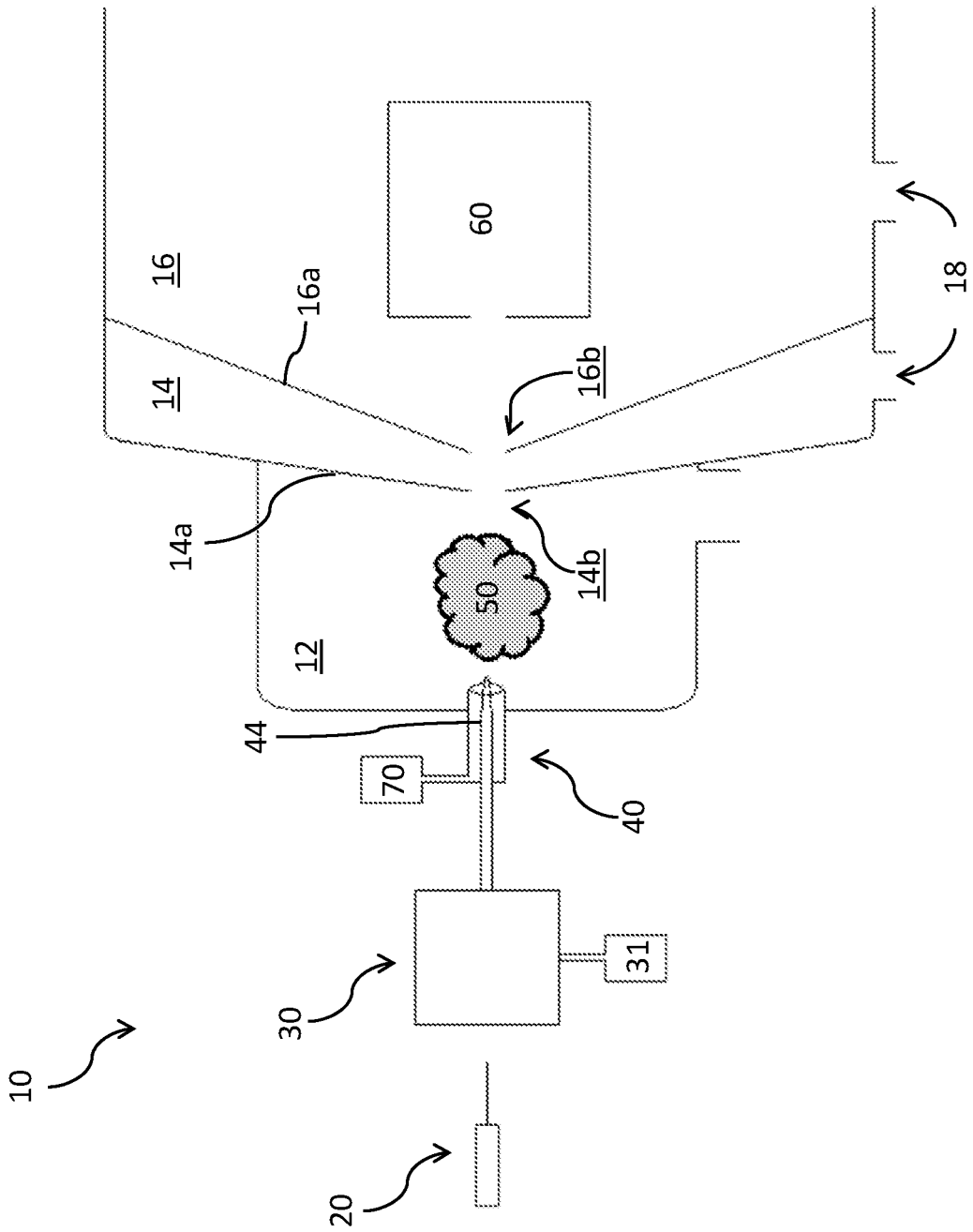
FIG. 1, in a schematic diagram, illustrates an exemplary system comprising a substrate sampling probe fluidly coupled to an electrospray ion source of a mass spectrometer system in accordance with various aspects of the applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

MS-based methods and systems are exemplified herein in which a desorption solvent desorbs one or more analyte species from a sample substrate (e.g., a SPME device) within a sampling interface (e.g., an open port probe) that is fluidly coupled to an ion source for subsequent mass spectrometric analysis (e.g., without a liquid chromatography (LC) column between the sampling interface and the ion source). In accordance with various aspects of the applicant's teachings, the sampling interface includes an internal sampling conduit that provides increased interaction between the desorption solvent and the sampling substrate, thereby improving mass transfer (e.g., increased extraction or desorption speed). Whereas current methods for ionizing liquid samples derived from SPME devices often utilize complex sample preparation steps in which SPME-extracted analytes are first desorbed from the SPME device and subsequently subject to additional sample processing steps (e.g., concentration/purification via LC) that are not amenable to automation prior to ionization/mass spectrometric analysis, systems and methods in accordance with various aspects of the present teachings provide a simplified workflow in which the sample substrate having one or more analytes adsorbed thereon can be coupled directly to the ion source of an MS system. In various aspects, the systems and methods described herein can eliminate the need for one or more time-consuming sample preparation steps while enabling fast coupling of sample substrates to the MS system (and fast desorption therefrom), with minimal alterations to the front-end of known systems, while nonetheless maintaining sensitivity, simplicity, selectivity, speed, and throughput. In addition to various embodiments' improved elution speed, peak shape (e.g., no tailing, sharper peaks), and sensitivity as noted above, the improved kinetics of mass transfer may also enable the use of a gradient in the composition of the desorption solvent (also referred to herein as an elution gradient) to bring an additional level of separation of the analytes adsorbed to sample substrates suitable for use in accordance with the present teachings. Moreover, in various aspects, the present teachings can enable a fully- or partially automated workflow, thereby further increasing throughput while potentially eliminating sources of human error in the analysis of SPME-derived samples.

As discussed in detail below, methods and systems in accordance with various aspects of the present teachings provide sampling interfaces configured to increase the sensitivity of SPME-based workflows. In some aspects, for example, sampling interfaces in accordance with the present teachings enable optimized liquid flow about the coated surface of the sample substrate to which the analyte(s) of interest may be adsorbed, and further, may account for diverse geometries of known or hereafter-developed sample substrates and SPME devices (e.g., fibers, blades, microtips, pins, or mesh). It will be appreciated by a person skilled in the art in light of the present teachings that considerations such as desired desorption fluid velocity and dead space can be optimized to maintain desorption kinetics to ensure sufficiently rapid desorption (so as to provide sharper peaks in MS data, for example, without tailing), reduced dilution (e.g., by providing desorption into a reduced volume of solvent), thereby improving instrument response and sensitivity. For example, as opposed to the sample substrate being disposed in a distal fluid chamber that is within an outer tube but distal to the inner tube, systems and methods in accordance with certain aspects of the present teachings provide an inner tube having a sampling volume exhibiting a cross-sectional area that can accommodate the coated surface of the sample substrate within the inner tube, thereby helping to subject the coated surface to consistent, non-stagnant fluid flow. Moreover, in some aspects, the shape and/or the maximum inner dimension of the substrate-receiving end of the inner tube can be configured to receive a particularly-shaped and/or sized sample substrate, for example, so as to reduce dead space and/or increase the surface area of the coated portion of the sample substrate disposed in contact with the flowing desorption solvent within the sampling volume of the inner tube. By way of example, in some aspects at least the portion of the inner tube containing the sampling volume may be replaced such that the particular sample substrate to be inserted occupies at least 20 percent (e.g., at least 50%, at least 80%) of the sampling volume.

FIG. 1 schematically depicts an embodiment of an exemplary system 10 in accordance with various aspects of the applicant's teachings for ionizing and mass analyzing SPME-extracted analytes. As shown in FIG. 1, the exemplary system 10 generally includes a substrate sampling probe 30 (e.g., an open port probe) in fluid communication with an ion source 40 for discharging a liquid containing one or more sample analytes into an ionization chamber 12, and a mass analyzer 60 in fluid communication with the ionization chamber 12 for downstream processing and/or detection of ions generated by the ion source. As will be discussed in more detail below, the substrate sampling probe 30 is generally configured to receive at least a portion of a sample substrate (e.g., SPME substrate 20) having a surface coated with an extraction phase to which one or more analytes from a sample are adsorbed within a sampling volume of an inner tube of the substrate sampling probe, the sampling volume being in a fluid pathway extending between a desorption solvent source 31 and the ion source probe (e.g., electrospray electrode 44). In this manner, analytes desorbed from the coated surface of the SPME substrate 20 by the desorption solvent flow directly to the ion source 40 within the desorption solvent for ionization thereby.

In the depicted embodiment, the ionization chamber 12 can be maintained at an atmospheric pressure, though in some embodiments, the ionization chamber 12 can be evacuated to a pressure lower than atmospheric pressure. The ionization chamber 12, within which analytes desorbed from the SPME substrate 20 and contained in the desorption solvent that is discharged from the electrospray electrode 44 can be ionized, is separated from a gas curtain chamber 14 by a plate 14a having a curtain plate aperture 14b. As shown, a vacuum chamber 16, which houses the mass analyzer 60, is separated from the curtain chamber 14 by a plate 16a having a vacuum chamber sampling orifice 16b. The curtain chamber 14 and vacuum chamber 16 can be maintained at a selected pressure(s) (e.g., the same or different sub-atmospheric pressures, a pressure lower than the ionization chamber) by evacuation through one or more vacuum pump ports 18.

The ion source 40 can have a variety of configurations but is generally configured to generate ions from analyte(s) contained within a liquid (e.g., the desorption solvent) received from the substrate sampling probe 30. In the exemplary embodiment depicted in FIG. 1, an electrospray electrode 44, which can comprise a capillary fluidly coupled to the substrate sampling probe 20, terminates in an outlet end that at least partially extends into the ionization chamber 12 and discharges the desorption solvent therein. As will be appreciated by a person skilled in the art in light of the present teachings, the outlet end of the electrospray electrode 44 can atomize, aerosolize, nebulize, or otherwise discharge (e.g., spray with a nozzle) the desorption solvent into the ionization chamber 12 to form a sample plume 50 comprising a plurality of micro-droplets generally directed toward (e.g., in the vicinity of) the curtain plate aperture 14b and vacuum chamber sampling orifice 16b. As is known in the art, analytes contained within the micro-droplets can be ionized (i.e., charged) by the ion source 40, for example, as the sample plume 50 is generated. By way of non-limiting example, the outlet end of the electrospray electrode 44 can be made of a conductive material and electrically coupled to a pole of a voltage source (not shown), while the other pole of the voltage source can be grounded. Micro-droplets contained within the sample plume 50 can thus be charged by the voltage applied to the outlet end such that as the desorption solvent within the droplets evaporates during desolvation in the ionization chamber 12, bare charged analyte ions are released and drawn toward and through the apertures 14b, 16b and focused (e.g., via one or more ion lens) into the mass analyzer 60. Though the ion source probe is generally described herein as an electrospray electrode 44, it should be appreciated that any number of different ionization techniques known in the art for ionizing liquid samples and modified in accordance with the present teachings can be utilized as the ion source 40. By way of non-limiting example, the ion source 40 can be an electrospray ionization device, a nebulizer assisted electrospray device, a chemical ionization device, a nebulizer assisted atomization device, a photoionization device, a laser ionization device, a thermospray ionization device, or a sonic spray ionization device.

With continued reference to FIG. 1, the mass spectrometer system 10 can optionally include a source 70 of pressurized gas (e.g. nitrogen, air, or noble gas) that supplies a high velocity nebulizing gas flow which surrounds the outlet end of the electrospray electrode 44 and interacts with the fluid discharged therefrom to enhance the formation of the sample plume 50 and the ion release within the plume for sampling by 14b and 16b, e.g., via the interaction of the high speed nebulizing flow and jet of liquid sample. The nebulizer gas can be supplied at a variety of flow rates, for example, in a range from about 0.1 L/min to about 20 L/min.

It will also be appreciated by a person skilled in the art and in light of the teachings herein that the mass analyzer 60 can have a variety of configurations. Generally, the mass analyzer 60 is configured to process (e.g., filter, sort, dissociate, detect, etc.) sample ions generated by the ion source 40. By way of non-limiting example, the mass analyzer 60 can be a triple quadrupole mass spectrometer, or any other mass analyzer known in the art and modified in accordance with the teachings herein. It will further be appreciated that any number of additional elements can be included in the mass spectrometer system including, for example, an ion mobility spectrometer (e.g., a differential mobility spectrometer) that is configured to separate ions based on their mobility through a drift gas rather than their mass-to-charge ratio. Additionally, it will be appreciated that the mass analyzer 60 can comprise a detector that can detect the ions which pass through the analyzer 60 and can, for example, supply a signal indicative of the number of ions per second that are detected.

Figure 2A:
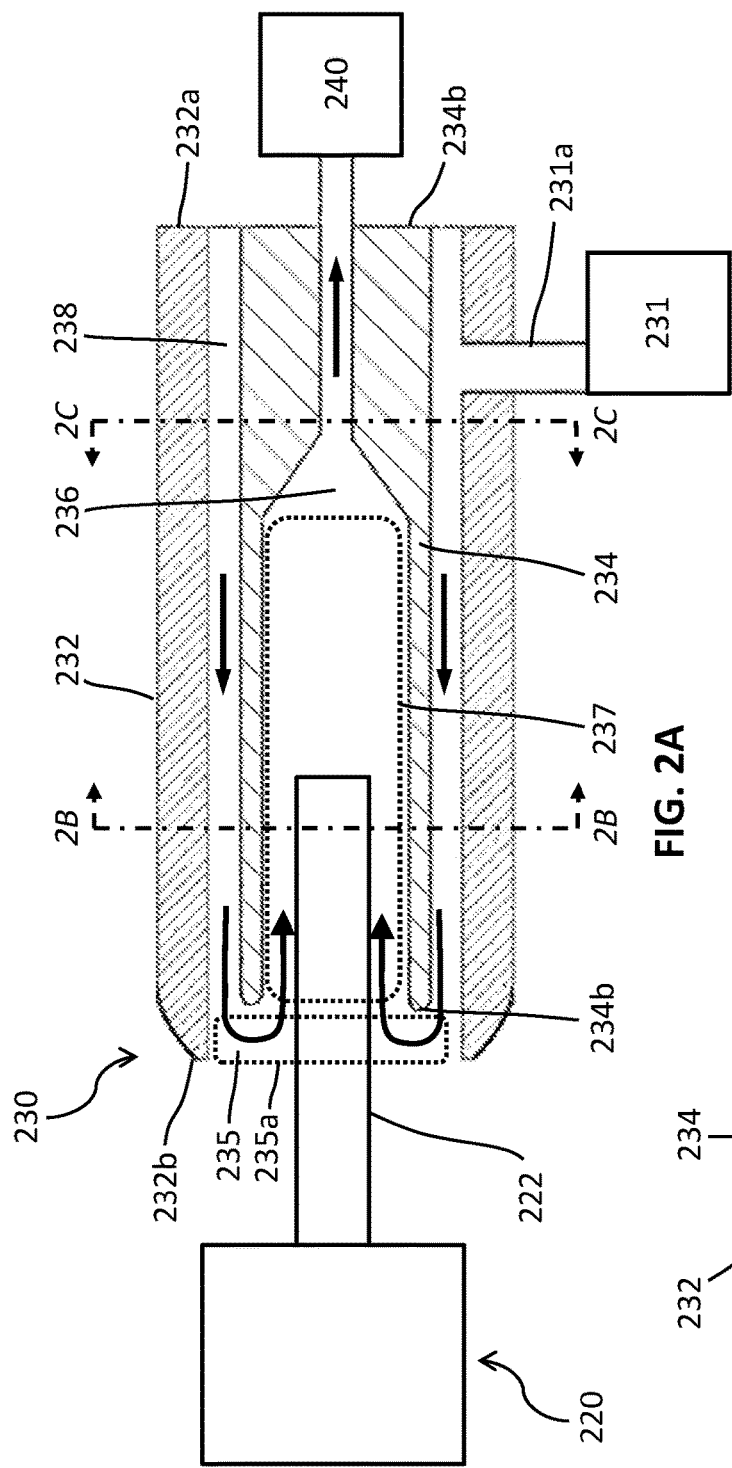
FIGS. 2A-C schematically illustrate an exemplary substrate sampling probe suitable for use in the system of FIG. 1 in accordance with various aspects of the applicant's teachings.
Figure 2C:
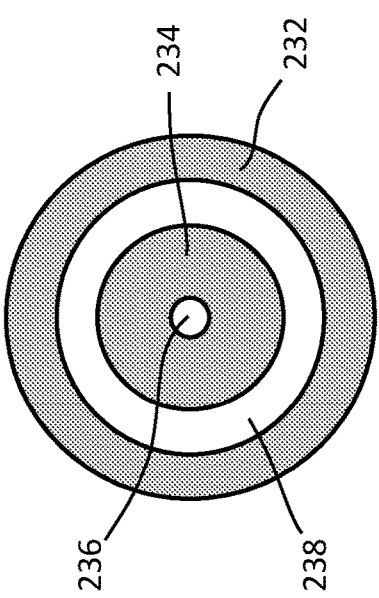
Figure 2B:
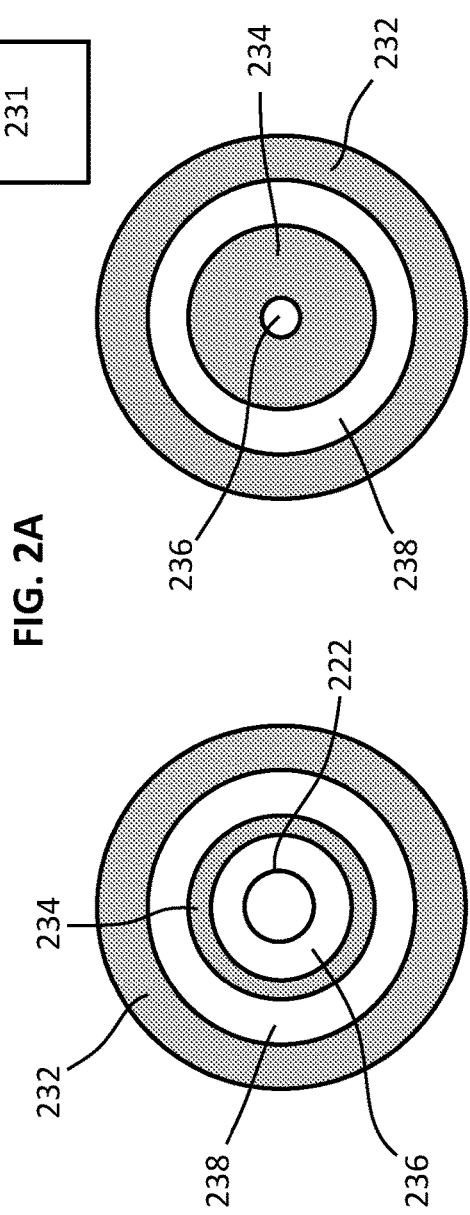

With reference now to FIGS. 2A-C, an exemplary substrate sampling probe 230 (e.g., an open port probe modified in accordance with various aspects of the present teachings) for desorbing one or more analytes from a SPME substrate 220 and suitable for use in the system of FIG. 1 is schematically depicted. As shown in FIG. 2A, the substrate sampling probe 230 includes an outer tube (e.g., outer capillary tube 232) extending from a proximal end 232a to a distal end 232b and an inner tube (e.g., inner capillary tube 234) disposed co-axially within the outer capillary tube 232. The inner capillary tube 234 also extends from a proximal end 234a to a distal end 234b. The inner capillary tube 234 comprises an axial bore providing a fluid channel therethrough, which as shown in the exemplary embodiment of FIGS. 2A-C defines a sampling conduit 236 through which liquid can be transmitted from the substrate sampling probe 230 to the ion source 40 of FIG. 1 (i.e., the sampling conduit 236 is fluidly coupled to inner bore of the electrospray electrode 44). On the other hand, the annular space between the inner surface of the outer capillary tube 232 and the outer surface of the inner capillary tube 234 can define a desorption solvent conduit 238 extending from an inlet end coupled to the desorption solvent source 231 (e.g., via conduit 231a) to an outlet end (adjacent the distal end 234b of the inner capillary tube 234). As shown in this exemplary embodiment, the distal end 234b of the inner capillary tube 234 is recessed relative to the distal end 232b of the outer capillary tube 232 so as to define a distal fluid chamber 235 that extends distally from the distal end 234b of the inner capillary 234 to the liquid-air interface 235a, which is depicted as being level with the distal end 232b of the outer capillary tube 232. Thus, the distal fluid chamber 235 is defined by the distal end 234b of the inner capillary 234, the inner circumferential surface of the distal end 232b of the outer capillary tube, and the liquid/air interface 235, and represents the space through which fluid flows from the outlet end of the desorption solvent conduit 238 to enter the sampling conduit 236. That is, as indicated by the curved arrows of FIG. 2, the desorption solvent conduit 238 is in fluid communication with the sampling conduit 236 via this distal fluid chamber 235. In this manner and depending on the flow rates of the respective channels, fluid that is delivered to the distal fluid chamber 235 by the desorption solvent conduit 238 can enter the inlet end of the sampling conduit 236 for transmission to its outlet end and subsequently to the ion source 240.

The sampling conduit 236 can have a variety of configurations, but generally exhibits a relatively larger cross-section at its distal, sample substrate-receiving end. As shown in FIGS. 2A-C, for example, the sampling conduit 236 defined by the inner tube 234 exhibits a circular cross-sectional shape at both its proximal portion (FIG. 2C) and its distal portion (FIG. 2B), though the distal portion has an increased diameter and cross-sectional area relative to the proximal portion. As indicated by the dotted lines within the inner tube 237 of FIG. 2A, this distal portion having a relatively increased cross-sectional area defines a sampling volume 237 that can accommodate at least a portion of the sampling substrate 220. For example, the largest maximum linear dimension of the cross-section of the sampling volume 237 is greater than the maximum linear dimension of the cross-section of the portion of a sample substrate 220 that is configured to be inserted therein. It will further be noted that in some aspects of the present teachings as exemplified in FIGS. 2A-C, the maximum linear dimension of the sampling conduit's proximal portion's cross-section (FIG. 2C) may be less than the maximum linear dimension of the cross-section of the portion of the sample substrate 220 that is configured to be inserted within the sampling volume 237 such that the sample substrate would be prevented from entering the proximal portion of the of the sampling conduit 236.

In particular, as shown in FIG. 2A, a portion of the SPME substrate 220 comprising a coated surface 222 having analytes adsorbed thereto can be inserted through the open end of the substrate sampling probe 230 and through the distal fluid chamber 235 such that the coated surface 222 of the SPME substrate 220 is disposed in the desorption solvent within the sampling volume 237 internal to the inner tube 234. Thus, as indicated by the curved arrows of FIG. 2, the desorption solvent conduit 238 is in fluid communication with the sampling volume 237 of the sampling conduit 236 via this distal fluid chamber 235. In this manner and depending on the volumetric flow rates of the respective channels, fluid that is delivered to the distal fluid chamber 235 by the desorption solvent conduit 238 enters the inlet of the sampling conduit 236. Whereas a coated surface 222 disposed exclusively in the distal fluid chamber 235 may be subject to substantially stagnant flows (especially adjacent the fluid/air interface 235a at the distal most end of the probe 230 and when a coated surface substantially fills the distal fluid chamber 235), the sampling volume's increased cross-sectional area at the distal portion of the inner tube 234 can allow the coated surface 222 to at least partially be disposed within the sampling conduit 236, thereby providing a higher maximum fluid velocity by and around the coated surface 222 as the desorption solvent follows the path from the outlet of the desorption solvent conduit 238 to the inlet of the sampling conduit 236 via the distal fluid chamber 235, as indicated by the curved arrows.

The sampling conduit 236 can have a variety of configurations, but generally exhibits a relatively large cross-section at its distal, sample substrate-receiving end. In any event, assuming that all fluid flowing from the desorption solvent conduit 238 flows into the sampling conduit 236 and to the ion source 240 (e.g., there is no overflow out of the distal end of outer tube 232), it will be appreciated that the volumetric flow rates within the desorption solvent conduit 238 and the sampling conduit 236 would be identical. Moreover, because fluid flowing from the distal portion of the sampling conduit 236 at the level of the sampling volume 237 (e.g., at the level of FIG. 2B) flows to the distal portion of the sampling conduit 236 (e.g., at the level of FIG. 2C) and to the ion source 240, the volumetric flow rates within the sampling conduit 236 at the cross-sections of FIG. 2B and FIG. 2C would be identical despite the relatively slower maximum fluid velocity in the sampling volume 237 when no sampling substrate is disposed therein (due to the relatively larger cross-sectional area of the sampling volume). However, depending on the relative areas of the cross-sections of the coated surface 222, the sampling volume 237, and the proximal portion of the sampling conduit 236, the maximum fluid velocity of the desorption solvent within the sampling conduit 236 at the level of the cross-section of FIG. 2B may be greater than, equal to, or less than the maximum fluid velocity within the sampling conduit 236 at the level of the cross-section of FIG. 2C when a sampling substrate is disposed therein. In light of the present teachings, it will thus be appreciated by a person skilled in the art that the maximum fluid velocity around and about the coated surface 222 may be adjusted, for example, by providing an inner tube 234 of a configuration such that the annular space between the inner surface of the inner tube 234 and the coated surface has a different cross-sectional area than that shown in FIG. 2B. That is, assuming a coated surface 222 of the equivalent size shown in FIG. 2B and with the same volumetric flow rate being provided to the inlet of the sampling conduit 236, increasing the cross-sectional area of the sampling volume 237 would increase the space about the coated surface 222 (i.e., the annulus of FIG. 2B) and decrease the average and/or maximum fluid velocity through the sampling conduit at that cross-section. On the other hand, decreasing the cross-sectional area of the sampling volume 237 would decrease the area of the annulus of FIG. 2B, thereby increasing the maximum fluid velocity through that cross-section in order to conserve the same volumetric flow rate as in the previous example. It will further be appreciated by a person skilled in the art in light of the present teachings that the volumetric flow rate, desired maximum desorption fluid velocity, and optimum dead space volume about the coated surface 222 can be selected to maintain desorption kinetics to ensure sufficiently rapid desorption without overly-diluting the analytes so as to optimize instrument response and sensitivity.

In accordance with various aspects of the present teachings, at least a portion of the SPME substrate 220 can be inserted through the open end of the substrate sampling probe 230 such that a coated surface upon which one or more analyte species are adsorbed are disposed in the desorption solvent within the sampling volume 237 internal to the inner tube 234 (e.g., proximal to the internal tube's distal end 234b). For example, as noted above, the exemplary SPME substrate 220 shown in FIG. 2 comprises a coated surface 222 extending therefrom and upon which a SPME extraction phase (e.g., layer) has been formed and to which one or more analytes of interest have been adsorbed during extraction. Upon the coated surface 222 being inserted into the sampling volume 237, the desorption solvent flowing from the desorption solvent conduit 238 and into the sampling conduit 236 via the distal fluid chamber 235 can be effective to desorb at least a portion of the one or more analytes adsorbed on the coated surface 222 such that the desorbed analytes flow with the desorption solvent into the inlet of the sampling conduit 236. Sample substrates for use in systems and methods in accordance with the present teachings are generally able to be at least partially inserted into a fluid pathway provided by a substrate sampling probe 230 such that the desorption solvent provided thereby is effective to desorb one or more analytes of interest from the sample substrate, though the substrate configuration (e.g., fibers, blades, micro-tips, pins, or mesh) and/or SPME coating (e.g., HLB-PAN, C18-PAN, antibodies, etc.) is not particularly limited. Indeed, any known sample substrate and coating chemistries known in the art or hereafter developed and modified in accordance with the present teachings can be used in the methods and systems disclosed herein. Exemplary SPME devices suitable for use in accordance with various aspects of the present teachings are described, for example, in U.S. Pat. No. 5,691,205, entitled "Method and Devise for Solid Phase Microextraction and Desorption" and PCT Pub. No. WO2015188282 entitled "A Probe for Extraction of Molecules of Interest from a Sample," the teachings of which are hereby incorporated by reference in their entireties.

As shown in FIG. 2, the desorption solvent source 231 can be fluidly coupled to the desorption solvent conduit 238 via a supply conduit 231a through which desorption solvent can be delivered from a reservoir of desorption solvent at a selected volumetric flow rate (e.g., via one or more pumping mechanisms including reciprocating pumps, positive displacement pumps such as rotary, gear, plunger, piston, peristaltic, diaphragm pump, and other pumps such as gravity, impulse and centrifugal pumps can be used to pump liquid sample), all by way of non-limiting example. Any desorption solvent effective to desorb analytes from the sample substrate and amenable to the ionization process is suitable for use in the present teachings. Indeed, because of the improved mass transfer and rapid desorption that results from certain aspects of various embodiments, the present teachings may enable the provision of an elution gradient in which the composition of the desorption solvent changes over time while the sample substrate is disposed within the sampling volume. In this manner, a series of desorption solvents can be provided from one or more desorption solvent sources so as to serially desorb particular analytes from the coated surface (as an in an LC elution gradient).

Because of the rapid desorption, particular compounds may elute from the coated surface depending on the identity of the desorption solvent at a particular time, thereby enabling resolution between particular MS peaks (exhibiting limited tailing) that correspond to the particular compound(s).

Similarly, it will be appreciated that one or more pumping mechanisms can be provided for controlling the volumetric flow rate through the sampling conduit 236 and/or the electrospray electrode (not shown), these volumetric flow rates selected to be the same or different from the volumetric flow rate of the desorption solvent through the desorption solvent conduit 238. In some aspects, these different volumetric flow rates through the various channels of the substrate sampling probe 230 and/or the electrospray electrode 244 can be independently adjusted (e.g., by adjusting the flow rate of the nebulizer gas) so as to control the movement of fluid throughout the system. By way of non-limiting example, the volumetric flow rate through the desorption solvent conduit 238 can be temporarily increased relative to the volumetric flow rate through the sampling conduit 236 (e.g., after withdrawal of a substrate) such that the fluid in the distal fluid chamber 235 overflows from the open end of the substrate sampling probe 230 to clean any residual sample deposited by the withdrawn substrate and/or to prevent any airborne material from being transmitted into the sampling conduit 236. In other aspects, the volumetric flow rates can be adjusted such that the fluid flow is decreased upon insertion of the substrate so as to concentrate the desorbed analytes in a smaller volume of desorption solvent.

It will be appreciated that substrate sampling probes in accordance with the present teachings can have a variety of configuration and sizes, with the depiction of the substrate sampling probe 230 of FIGS. 2A-C representing an exemplary depiction. By way of non-limiting example, the dimensions of an inner diameter (ID) of the inner capillary tube 234 can be in a range from about 100 micron to about 3 mm (e.g., about 0.5 mm, about 3 mm), with exemplary dimensions of the outer diameter (OD) of the inner capillary tube 234 being in a range from about 300 microns to about 3 or 4 centimeters (e.g., $ID_{inner}$:$OD_{inner}$ combination can be about 0.5 mm:1.5 mm or about 3 mm:4 mm). Also by way of example, the ID of the outer capillary tube 232 can be in a range from about 400 microns to about 3 or 4 centimeters, with the typical dimensions of the OD of the outer capillary tube 232 being in a range from about 500 microns to about 3 or 4 centimeters (e.g., $ID_{outer}$:$OD_{outer}$ combinations can be about can be about 2 mm:3 mm or about 5 mm:6 mm). Additionally, though depicted as circular in FIGS. 2A-C. the cross-sectional shapes of the inner capillary tube 234 and/or the outer capillary tube 232 can be circular, elliptical, superelliptical (i.e., shaped like a superellipse), or even polygonal (e.g., square). Moreover, the shape of the cross-sectional areas of the inner or outer capillary tubes 234, 232 need not be constant along the length of the capillary. By way of example, the distal portion of the sampling conduit 236 at the level of the sampling volume 237 can have a first shape (e.g., polygonal to accommodate a rectangular substrate), while the proximal portion of the sampling conduit can be a second shape (e.g., circular), albeit with a smaller cross-sectional area as otherwise discussed herein. Additional details regarding SPME sampling probes suitable for use in the system of FIG. 1 and modified in accordance with the present teachings can be found, for example, in the Van Berkel article reference above; U.S. Pub. No. 20130294971 entitled "Surface Sampling Concentration and Reaction Probe"; U.S. Pub. No. 20140216177 entitled "Method and System for formation and Withdrawal of a Sample From a Surface to be Analyzed"; and U.S. Pub. No. 2017316926 entitled "Sampling Interface for Mass Spectrometry Systems and Methods," the teachings of which are hereby incorporated by reference in their entireties.

With reference now to FIG. 3A-C, another exemplary substrate sampling probe 330 in accordance with various aspects of the present teachings is depicted. As shown, the probe 330 is configured to be alternatively coupled to the same ion source 240 and/or desorption solvent source 231 as the probe 230 of FIGS. 2A-C such that probe 330 can be used in place of probe 230 depending, for example, on the size and/or shape of the particular SPME substrate 320 that was utilized to extract analytes from a sample. For example, the probe 330 is similar to that of FIGS. 2A-C in that the probe 330 comprises co-axial inner and outer tubes 334, 332, the inner tube 334 defining a sampling conduit 336 having a distal portion with an enlarged cross-sectional area (FIG. 3B) relative to a proximal portion of the sampling conduit 336 (FIG. 3C). However, the probe 330 differs from probe 230 in that the inner tube 334 is disposed within the outer tube 332 such that the distal-most end 334b of the inner tube 334 is co-planar with the distal-most end 332b of the outer tube 332 (rather than recessed as in FIG. 2A). By controlling the volumetric flow rates through the desorption solvent conduit 338 and sampling conduit 336, a distal fluid chamber 335 can nonetheless be formed between the distal end 334b of the inner tube 334 as indicated by the exemplary convex meniscus of the liquid/air interface 335a formed due to cohesion of the desorption solvent molecules. Thus, even though distal ends of the inner and outer tubes 334, 332 are co-planar, fluid may still flow from the desorption solvent conduit 338 to the sampling volume 337 within the inner tube via the fluid chamber 335. Indeed, it will be appreciated that volumetric flow rates can be controlled in either exemplary embodiment of FIGS. 2A and 3A such that at least a portion of the liquid/air interface can be proximal or distal to the distal end of the outer tube (with or without overflow therefrom) depending, for example, on the relative volumetric flow rates of the desorption solvent within the desorption solvent conduit and sampling conduit and the viscosity of the desorption solvent conduit. Importantly, sample probes in accordance with various aspects of the present teachings can be intentionally overflowed even during sampling (e.g., by sufficiently increasing the volumetric flow rate in the desorption solvent conduit to be greater than the volumetric flow rate in the sampling conduit). Whereas the overflow from known open-atmosphere sampling interfaces may result in the loss of sample (and thus decreased sensitivity), sampling interfaces in accordance with the present teachings can intentionally overflow the fluid chambers 235, 335 during sampling (e.g., so as to reduce contamination) and without a reduction in sensitivity because the coated surfaces to which analytes are adsorbed may be disposed within the internal sampling volume of the inner tube. As such, desorption solvent that comes into contact with the coated surface has already been transported through the overflowing fluid chamber, and is thus not subject to overflow and potential sample loss.

Moreover, the probe 330 of FIG. 3A-C also differs from probe 230 in that the distal portion of the sampling conduit 336 at the level of the sampling interface 337 (see FIG. 3B) exhibits a substantially square cross sectional area (e.g., to accommodate a coated surface 322 having a square cross-sectional area), while the proximal portion of the sampling conduit 336 remains circular (as in probe 230). Additionally, the exemplary probe 330 also differs from the probe 230 in that the cross-sectional area of the sampling conduit 337 is smaller than that of probe 230. Though the coated surface 322 of probe 320 may be able to fit within the sampling volume 237 of probe 230, it will be appreciated that a different cross-sectional shape and/or a smaller cross-sectional area of the sampling volume 237 like that of FIGS. 3A-C may be desired to optimally desorb analytes from the particular substrate 320 (e.g., to avoid excessive dilution) and so as to optimize instrument response and sensitivity, as discussed otherwise herein.

Though the sampling volumes 237, 337 of probes 230, 330 appear to be approximately the same length as one another, it will also be appreciated that the lengths of the sampling volume can also differ, with certain embodiments in accordance with the present teachings exhibiting sampling volumes having sufficient length to receive therein the entire portion of the SPME substrate having analytes adsorbed thereto. As shown in FIG. 3A, for example, the entirety of the coated surface 322 may be disposed within the sampling volume 337. To help ensure that the entirety of the coated surface 322 is disposed within the sampling volume 337, various aspects of the present teachings also provide one or more sensors to help determine the relative position of the coated portion of the sample substrate within the sampling volume. By way of example, as shown in FIG. 3A, the probe 330 comprises a first sensor 323a that may be configured to provide a signal indicating that the sample substrate 320 has been inserted through the fluid chamber 335 and into sampling volume 337 a sufficient distance such that the entire coated surface 322 is disposed within the sampling volume 337. Additionally or alternatively, a second set of sensors 323b may be configured to provide a signal to prevent the over-insertion of the sample substrate 320, for example, to avoid the coated surface 322 from coming into contact with the inner tube 334 proximally beyond the sampling volume 337. Signals provided by either sensor 323a or sensors 323b may be configured to control an automated system for introducing the sample substrate into the sampling probe or for alerting a user regarding the position of an inserted probe, by way of non-limiting example. It will be appreciated that the sensors can comprise a variety of mechanisms for determining when the sample substrate has been inserted to a particular level such as through optical or ultrasonic means, by way of non-limiting example. For example, sensor 323a can comprise an ultrasonic transducer that emits ultrasonic energy across the sampling volume 337, with the timing of the reflected ultrasonic waves signaling if there is an object within the sampling conduit 336 at the level of the sensor 323a. Also by way of example, sensors 323b can comprise a light source on one side of the sampling conduit 336 and an optical detector on the other such that a signal could be provided when a light beam transmitted by the light source is no longer detected by optical detector.

Because not a single sampling volume of a certain size, geometry, and configuration may be optimized for every substrate in light of the present teachings, it will be appreciated that a plurality of different probes may be provided for use with a single MS-based system. However, rather than replacing an entire probe, some users may instead wish to reconfigure the probe depending on the particular substrate to be analyzed, for example, by replacing various portions of the probes. For example, with reference now to FIGS. 4A-B, another exemplary sampling probe 430 in accordance with various aspects of the present teachings is depicted. As shown in FIG. 4A, the probe 430 is similar to probe 230 of FIG. 2A, but differs in that the distal portion 434d of the inner tube 434 (which included the enlarged sampling volume) is removably coupled to the proximal portion 434c of the inner tube 424. In such aspects, the distal portion 434d comprising a first sampling volume of a certain size, shape, and/or length can be removed (e.g., unscrewed) and instead replaced with another distal portion 434e defining a second sampling volume of a size, shape, and/or length depending, for example, on the size, shape, and/or length of the substrate to which the analytes are adsorbed. The coupling mechanism can have a variety of configurations, but is generally configured to secure the portions together while maintaining a continuous fluid channel. As shown in FIGS. 4A-B, for example, each of the distal portions 434d,e can comprise threads 439 that may be threaded into a corresponding bore of the proximal portion 434c.

With reference now to FIGS. 5A-B, another exemplary sampling probe 530 is depicted in which the distal portions 534d,e of the inner tube 534 are instead interchangeably coupled to the proximal portion 534c of the inner tube 524 via press-fit coupling 539. Because the inner tubes of substrate sampling probes in accordance with certain embodiments need not be circular, it may be preferable to utilize such a non-rotating coupling mechanism such that an inner tube having a non-circular external shape may be interchangeable with one or more other inner tubes having a circular or a different non-circular external shape. In this manner, the present teachings may also in some embodiments provide a kit comprising one or more SPME substrates of various sizes/shapes and one or more sampling probes (or replaceable portions thereof) configured to receive the particular SPME substrates within the sampling volumes optimized for the corresponding substrate.

Figure 6:
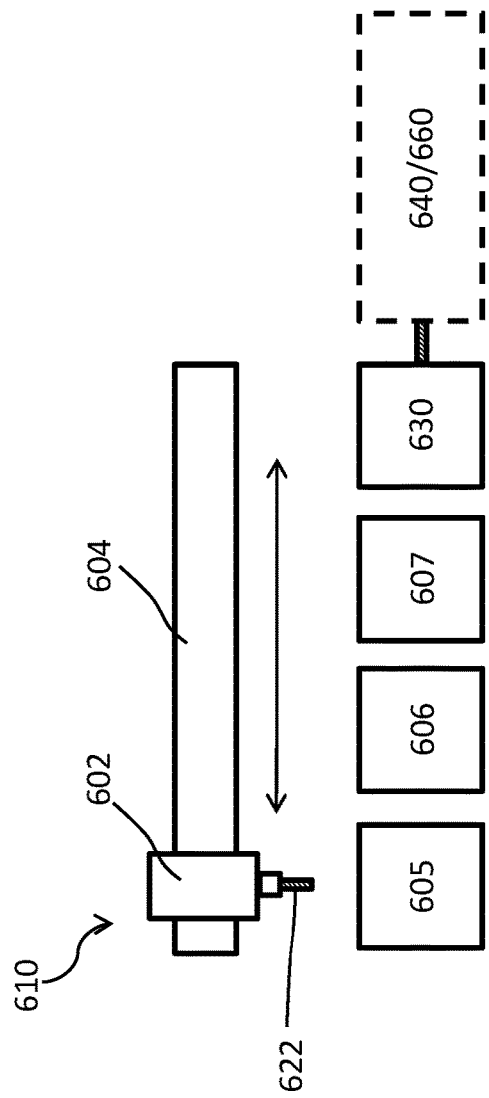
FIG. 6 depicts in schematic diagram an exemplary automated system for sample analysis in accordance with various aspects of the applicant's present teachings.

With reference now to FIG. 6, an exemplary automated sample analysis system 610 in accordance with various aspects of the present teachings is depicted. As shown in FIG. 6 and discussed otherwise herein, the present teachings may reduce and/or eliminate the need for complex and time-consuming sample preparation steps such as liquid chromatography, thus enabling SPME-MS analysis in an automated fashion. As shown, the exemplary system 610 includes an actuation mechanism 604 (e.g., robotic arm, stage, electromechanical translator, step motor, etc.) that is coupled to a sample holder 602 configured to grip, hold, or otherwise couple to a SPME substrate 622. One exemplary robotic system suitable for use in accordance with the present teachings is the Concept-96 autosampler marketed by PAS Technologies. Under the control of a controller (not shown) and without human intervention, for example, the actuation mechanism 604 can be configured to transfer the substrate 622 through the complete sample preparation workflow including, for example, conditioning the substrate 622 in element 605 (e.g., coating or otherwise functionalizing the surface to enable extraction of an analyte of interest), extraction/enrichment of the analytes from the sample in element 606 (e.g., by immersing the coated surface in the sample, with or without vortexing), rinsing the extracted sample in element 607 (e.g., by immersing the SPME substrate having analytes adsorbed thereto in $H_2O$ so as to remove some interfering molecules, salts, proteins, etc.), and inserting the rinsed SPME substrate into the sampling volume of the inner tube of the substrate sampling probe 630. As discussed otherwise herein, the substrate sampling probe 630 is configured to desorb the analytes from the SPME substrate utilizing the desorption solvent in flowing fluid contact with the coated portion of the SPME substrate and delivering the desorption solvent containing said desorbed analytes directly to the ion source 640/mass spectrometer system 660 for ionization/mass spectrometric analysis. In various aspects, the desorbing solvent can be pumped continuously through the substrate sampling probe 630, or alternatively, can be set in stand-by mode, for example, during the extraction step. It will also be appreciated that one or more of these steps can be excluded in an automated sample protocol. By way of non-limiting example, rather than perform on-line substrate conditioning and desorption with the system 610, these steps may be performed "off-line", for example in a remote location with the SPME substrate having analytes adsorbed thereto being sent to the laboratory for desorption and MS analysis.

Figure 7:
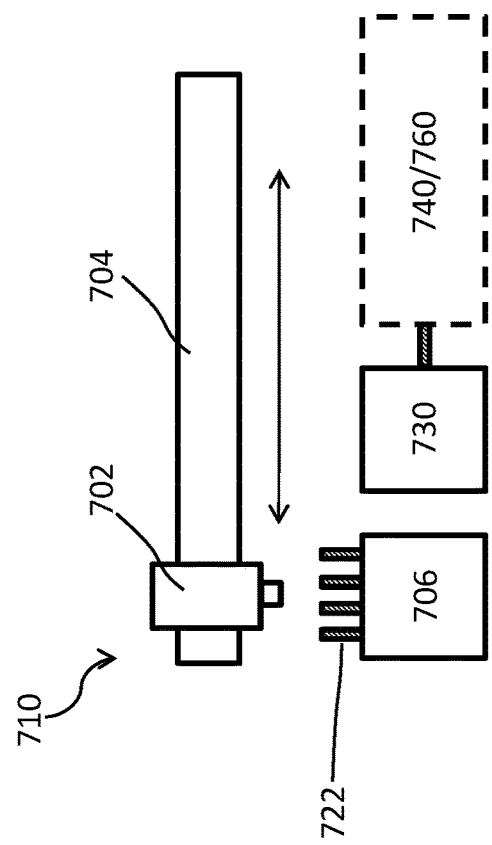
FIG. 7 depicts in schematic diagram another exemplary automated system for sample analysis in accordance with various aspects of the applicant's present teachings.

With reference now to FIG. 7, another exemplary automated system 710 in accordance with various aspects of the present teachings is depicted. System 710 is similar to that depicted in FIG. 6 in that it in includes an actuation mechanism 704 and a sample holder 702, but differs in that the system 710 includes a specimen stage configured to support a plurality of SPME substrates 722. In such a system, for example, a controller (not shown) can sequentially transfer each of the SPME fibers to the substrate sampling probe 730 (or one of one or more sampling probes each of which defines a sampling volume optimized for a particular substrate) for desorbing the analyte therefrom and delivering the desorbed analytes directly to the ion source 740/mass spectrometer system 760 via fluidic coupling for ionization/mass spectrometric analysis. Additionally, as with system 610 of FIG. 6, the system 710 can utilize step-wise protocols (e.g. steps 605, 606, 607 . . . ). Such steps can be achieved simultaneously for multiple SPME devices for high-throughput. It will be noted that like the system 710 of FIG. 7, the system of FIG. 6 can additionally include a specimen stage configured to support a plurality of SPME devices for the analysis of one or more different samples.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

What is claimed is:

1. A system for analyzing a chemical composition of a specimen, comprising:
    a substrate sampling probe comprising:
    an inner tube extending from a proximal end to a distal end, said inner tube defining a sampling conduit extending from a distal inlet to a proximal outlet configured to fluidly couple to an ion source probe for discharging desorption solvent in an ionization chamber in fluid communication with a sampling orifice of a mass spectrometer;
    an outer tube extending from a proximal end to a distal end and disposed about said inner tube, said outer tube defining a desorption solvent conduit extending from an proximal inlet configured to be in fluid communication with a desorption solvent source to a distal outlet,
    wherein the distal end of the inner tube is disposed relative to the distal end of the outer tube so as to define a fluid chamber extending distally from the distal end of the inner tube to a liquid/air interface, wherein the fluid chamber is in fluid communication with the distal outlet of the desorption solvent conduit and the distal inlet of the sampling conduit,
    wherein the sampling conduit comprises a sampling volume within the distal end of the inner tube adjacent to the fluid chamber, the sampling volume exhibiting a cross sectional area greater than a cross sectional area of a proximal portion of the sampling conduit, the sampling volume being configured to receive a coated surface of a sample substrate having one or more analyte species adsorbed thereto such that the coated surface is in contact with the desorption solvent within the sampling volume as the desorption solvent flows from the inlet of the desorption solvent conduit through the fluid chamber to the outlet of the sampling conduit.

2. The system of claim 1, wherein a maximum fluid velocity through the sampling volume is lower than a maximum fluid velocity through the proximal portion of the sampling conduit when the coated surface of the sample substrate is not disposed within the sampling volume.

3. The system of claim 1, wherein the distal end of the inner tube is recessed relative to the distal end of the outer tube such that the fluid chamber comprises a volume between the distal end of the inner tube and the distal end of the outer tube.

4. The system of claim 1, wherein the sample substrate comprises a SPME substrate.

5. The system of claim 1, wherein the sampling volume is sized such that the entire coated surface of the sample substrate may be disposed within the sampling volume.

6. The system of claim 1, wherein the sampling volume exhibits a circular cross-sectional shape.

7. The system of claim 1, wherein the sampling volume exhibits a rectangular cross-sectional shape.

8. The system of claim 1, wherein a distal portion of the inner tube comprising the sampling volume is configured to be replaced with a second distal portion exhibiting a second sampling volume that is different in at least one of shape and cross-sectional area from the sampling volume.

9. The system of claim 1, further comprising:
    at least one desorption solvent source fluidly coupled to the inlet of the desorption solvent conduit; and
    a pump mechanism for delivering the desorption solvent from the at least one desorption solvent source to the inlet of the desorption solvent conduit.

10. The system of claim 1, further comprising an ion source probe, an ionization chamber, and a mass spectrometer system, wherein the ion source probe is in fluid communication with the outlet of the sampling conduit and comprises a terminal end disposed in the ionization chamber, wherein analytes contained within said desorption solvent are configured to ionize as the desorption solvent is discharged into the ionization chamber.

11. The system of claim 1, further comprising a specimen holder configured to support the sample substrate; and
    an actuation mechanism coupled to the specimen holder and configured to insert the sample substrate into the distal end of the outer tube such that the coated surface of said sample substrate is in contact with the desorption solvent within the sampling volume.

12. A method for performing chemical analysis, comprising:
    inserting at least a portion of a sample substrate into an open end of a substrate sampling probe, said sample substrate having a surface coated with an extraction phase to which one or more analyte species are adsorbed, said substrate sampling probe comprising:
    an inner tube extending from a proximal end to a distal end, said inner tube defining a sampling conduit extending from a distal inlet to a proximal outlet;

an outer tube extending from a proximal end to a distal end and disposed about said inner tube, said outer tube defining a desorption solvent conduit extending from a proximal inlet configured to be in fluid communication with a desorption solvent source, wherein the distal end of the inner tube is disposed relative to the distal end of the outer tube so as to define a fluid chamber extending distally from the distal end of the inner tube to a liquid/air interface, wherein the fluid chamber is in fluid communication with the distal outlet of the desorption solvent conduit and the distal inlet of the sampling conduit, and wherein the sampling conduit comprises a sampling volume within the distal end of the inner tube adjacent to the fluid chamber, the sampling volume exhibiting a cross sectional area greater than a cross sectional area of a proximal portion of the sampling conduit;

flowing said desorption solvent from the inlet of the desorption solvent conduit, through the fluid chamber, and to the outlet of the sampling conduit such that at least a portion of said one or more analyte species is desorbed from the coated surface and is delivered to ion source probe within said desorption solvent;

discharging said desorption solvent containing said portion of the one or more analyte species from said ion source probe so as to ionize said one or more analyte species; and performing mass spectrometric analysis on said one or more ionized analyte species.

13. The method of claim 12, wherein inserting at least the portion of the sample substrate comprises disposing the coated surface into the sampling volume within the inner tube.

14. The method of claim 12, further comprising inserting the sample substrate into a sample so as to adsorb said one or more analyte species contained within the sample to the coated surface.

15. The method of claim 12, wherein performing mass spectrometric analysis comprises further comprising performing MRM3 quantitation.

16. The method of claim 12, further comprising transmitting said one or more ionized analyte species through a differential mobility spectrometer prior to performing mass spectrometric analysis.

17. The method of claim 12, further comprising replacing a distal portion of the inner tube with a second distal portion comprising a second sampling volume that is different in at least one of shape and cross-sectional area.

18. The method of claim 12, wherein flowing said desorption solvent comprises providing an elution gradient to the sampling volume while the sample substrate is disposed within the sampling volume.

19. The method of claim 12, wherein flowing said desorption solvent comprises adjusting the composition of the desorption solvent to which the sample substrate is exposed when disposed within the sampling volume.

20. The method of claim 12, wherein a desorption solvent conduit volumetric flow rate is greater than a sampling volume volumetric flow rate such that at least a portion of said desorption solvent overflows from the distal end of the outer conduit when the sample substrate is inserted into the open end of a substrate sampling probe.

* * * * *